United States Patent [19]
de Rocheprise

[11] Patent Number: 5,518,676
[45] Date of Patent: May 21, 1996

[54] PROCESS AND EXTRUSION PRESS FOR MAKING HOLLOW BODY MADE OF FLUORO RESIN

[75] Inventor: Bernard M. de Rocheprise, Chalindrey, France

[73] Assignee: Compagnie Plastic Omnium, Lyon, France

[21] Appl. No.: 309,131

[22] Filed: Sep. 20, 1994

[30] Foreign Application Priority Data

Sep. 22, 1993 [FR] France .................................. 93 11265

[51] Int. Cl.⁶ ................................................. B29C 47/20
[52] U.S. Cl. ...................... 264/127; 264/209.8; 264/323; 425/380; 425/393; 425/467
[58] Field of Search ........................... 264/127, 150, 264/209.8, 108, 290.2, 323, 288.8; 425/380, 467, 393; 428/36.5, 36.9

[56] References Cited

U.S. PATENT DOCUMENTS

| | | | |
|---|---|---|---|
| 3,008,187 | 11/1961 | Slade | 425/380 |
| 3,260,774 | 7/1966 | Harlow | 264/127 |
| 3,295,166 | 1/1967 | Owings | 425/380 |
| 3,315,020 | 4/1967 | Gore . | |
| 3,859,017 | 1/1975 | Meudec | 425/380 |
| 3,981,672 | 9/1976 | Wilson . | |
| 4,056,594 | 11/1977 | Carrow | 264/323 |
| 4,225,547 | 9/1980 | Okita . | |
| 4,250,138 | 2/1981 | Okita | 264/127 |
| 4,282,277 | 8/1981 | Austen et al. . | |
| 4,482,516 | 11/1984 | Bowman et al. | 264/127 |
| 4,820,787 | 4/1989 | Kataoka et al. | 264/127 |
| 4,830,062 | 5/1989 | Yamamoto et al. | 264/127 |
| 4,876,051 | 10/1989 | Campbell et al. | 264/323 |
| 5,026,513 | 6/1991 | House et al. | 264/127 |
| 5,110,526 | 5/1992 | Hayashi | 425/380 |

FOREIGN PATENT DOCUMENTS

| | | | |
|---|---|---|---|
| 0267719 | 5/1988 | European Pat. Off. . | |
| 1285356 | 1/1962 | France . | |
| 3534407 | 4/1987 | Germany . | |
| 41-13625 | 7/1966 | Japan | 264/150 |
| 52-6761 | 1/1977 | Japan | 264/108 |
| 2086305 | 5/1982 | United Kingdom . | |
| 2236504 | 4/1991 | United Kingdom . | |

Primary Examiner—Jeffery R. Thurlow
Attorney, Agent, or Firm—Oliff & Berridge

[57] ABSTRACT

The invention relates to a hollow body made of fluoro resin, especially of PTFE, obtained by paste extrusion, exhibiting an anisotropy ratio lower than 1 and substantially equal to 0.5. For the manufacture of such hollow bodies a fluoro resin powder, especially unsintered PTFE, is mixed with lubricant, the mixture is compressed to obtain an isotropic compact tubular preform, the preform is introduced into an extrusion press, the preform is expelled through a passage of small cross-section of a die so as to form lengthwise-oriented fibers, the fibers are compressed at the exit of the passage in an internal expansion chamber of enlarged cross-section, so as to orient the fibers transversely, and the fibers are expelled through the exit orifice of the die to obtain a hollow body.

8 Claims, 2 Drawing Sheets

PROCESS AND EXTRUSION PRESS FOR MAKING HOLLOW BODY MADE OF FLUORO RESIN

FIELD OF THE INVENTION

The present invention relates to the manufacture of hollow bodies made of fluoro resin, comprising a low, adjustable, degree of anisotropy.

BACKGROUND

An extrusion process referred to by the name of paste or lubricated extrusion is known for the manufacture of hollow bodies such as tubes made of fluoro resin, especially of polytetrafluoroethylene (PTFE).

This process comprises stages consisting in mixing a fine powder of unsintered fluoro resin containing approximately 20% of lubricant, in compressing this mixture to obtain a compact tubular preform, and in introducing this preform into an extrusion press in which a ram expels the preform through a die to produce a tubular section.

This process makes it possible to produce fibres or fibrils of fluoro resin, these fibres being naturally oriented in the direction of the flow of material, in other words in the lengthwise direction of the body, as a result of the small section of the die exit orifice.

This lengthwise orientation of the fibres is generally detrimental from the viewpoint of mechanical strength, because it promotes the formation of lengthwise cracks when the body begins to burst, especially in the case of tubes subjected to an internal pressure.

An anisotropy ratio A substantially equal to 2 is generally obtained for a tube manufactured in this way.

$$A = \frac{\text{lengthwise tensile strength}}{\text{transverse tensile strength}}$$

For a hollow body under pressure to exhibit substantially the same risks of cracking in the lengthwise and transverse directions it is necessary for the transverse tensile strength to be twice the lengthwise tensile strength, that is to say for the anisotropy ratio A of the hollow body to be substantially equal to 0.5.

Numerous techniques are known which make it possible to reduce the anisotropy ratio of a product made of PTFE, obtained by lubricated extrusion.

A first technique consists in varying the reduction ratio R of the die.

$$R = \frac{\text{Section of the preform}}{\text{Section of the die exit orifice}}$$

The decrease in the reduction ratio of the die makes it possible to reduce the anisotropy ratio.

An example of this technique is provided by document U.S. Pat. No. 3,315,020, which permits the manufacture of biaxially oriented thin sheets which are substantially isotropic, that is to say exhibiting an anisotropy ratio close to 1.

Although these modifications make it possible to reduce the anisotropy ratio to the vicinity of 1, they frequently take place to the detriment of the absolute value of the tensile strength of the product obtained.

A second technique consists in subjecting the product to reheating which makes it possible to reduce the previous orientation of the fibres and therefore to obtain, here again, an anisotropy ratio A close to 1. However, this technique is particularly costly.

A third technique consists in employing highly modified powders which are therefore much more expensive than standard powders.

However, whatever the technique employed, it is currently impossible to obtain by paste extrusion products made of PTFE, and in particular hollow bodies, exhibiting an anisotropy ratio A substantially lower than 1.

SUMMARY OF THE INVENTION

The subject of the present invention is a hollow body made of fluoro resin, especially of PTFE, obtained by paste extrusion and exhibiting an anisotropy ratio substantially lower than 1 and preferably substantially equal to 0.5.

Another objective of the present invention is to propose an extrusion process making it possible to obtain such hollow bodies, in particular thick-walled tubes, without decrease in the absolute value of the tensile strength.

The subject of the present invention is an extrusion process for the manufacture of hollow bodies made of fluoro resin, according to which a fine powder of fluoro resin, especially of unsintered PTFE, is mixed with lubricant, the mixture is compressed to obtain an isotropic compact tubular preform, the said preform is introduced into an extrusion press and the preform is expelled through a passage of small cross-section of a die so as to form lengthwise-oriented fibres, wherein at the exit of the said passage the said fibres are compressed in an internal expansion chamber of enlarged cross-section, so as to orient the said fibres transversely, wherein after passing through the internal expansion chamber the fibres are passed through a second passage of small cross-section in order to reorient them partially in the lengthwise direction, the fibres are again compressed in an expansion zone of enlarged cross-section so as to predominantly preserve the transverse orientation of the fibres, and the fibres are expelled through the exit orifice of the die to obtain a hollow body.

The flow of the material through the extrusion press is thus divided into different zones, each permitting a determined orientation of the fibres.

A reduction in the cross-section of the exit orifice of a die results in a predominantly lengthwise orientation of the fibres and an increase in the cross-section of the said orifice results in a predominantly transverse orientation of the fibres. By adjusting the corresponding cross-sections of the different zones of the press it is therefore possible to adjust the anisotropy ratio of the hollow body obtained.

Another subject of the present invention is an extrusion press for making use of the abovementioned process, the said press comprising a die which at one end has a receiving cavity, preferably substantially conical, for receiving a tubular preform, which emerges into a passage of small cross-section, and a substantially cylindrical central member forming a die core and passing through the said reception cavity and the said passage, wherein the said passage emerges into an internal expansion chamber of enlarged cross-section, and wherein the said internal chamber is connected by a second passage of small cross-section to an exit cavity, preferably substantially conical and arranged at the opposite end of the die, and the said central member is connected to an expansion component, preferably substantially conical, located in the exit cavity so as to define an expansion zone of enlarged cross-section at the exit of the said second passage.

The die of the press according to this embodiment consists advantageously of two separate parts which fit into one another, the first part comprising the reception cavity and the first passage, and the second part comprising the second passage and the exit cavity, a housing, preferably frustoconical, being arranged in each of the facing ends of the said parts so as to form the said internal expansion chamber when the parts are fitted together.

The fact of envisaging the die as two separate parts makes it easily possible to vary the cross-section of the expansion chamber by replacing only one of the two parts at a time.

Advantageously, the inclination of the generatrix of the conical component in relation to its axis is slightly greater than that of the exit cavity, so as to reduce the cross-section of the expansion zone in the vicinity of the exit orifice of the die.

A new compression of the fibres in the expansion zone is thus obtained, and this makes it possible to reach a low anisotropy ratio, especially lower than 1 and even lower than 0.5.

The fact of envisaging a conical component in the die exit cavity makes it easily possible to vary the thickness of the tubular section manufactured by moving the conical component axially in the said exit cavity by means of the core.

In the conventional lubricated extrusion process the reduction ratios R employed are high, generally between 50 and 500.

It is generally accepted that the reduction ratio cannot exceed a threshold value, a function of the quality of powder employed, without causing a deterioration of the powder resulting from an excessively high compression of the said powder in the die.

Depending on the quality of powder employed, the latter may be subjected to a pressure of between 10 and 100 MPa.

In the die according to the present invention, at equal reduction ratio, the pressure to which the powder is subjected is markedly higher than that of a conventional die, because of the second passage of small cross-section forming a zone for additional compression of the powder.

In the extrusion process according to the present invention an overall reduction ratio in a range of between 2 and 20 is therefore advantageously employed, the said range making it possible to produce hollow bodies without deterioration of the powder.

BRIEF DESCRIPTION OF THE DRAWINGS

To make the subject of the present invention better understood a description thereof will be given below, by way of example which is purely illustrative and without any limitation being implied, of an embodiment shown in the attached drawing, in which.

DESCRIPTION OF PREFERRED EMBODIMENTS

Figure 1:
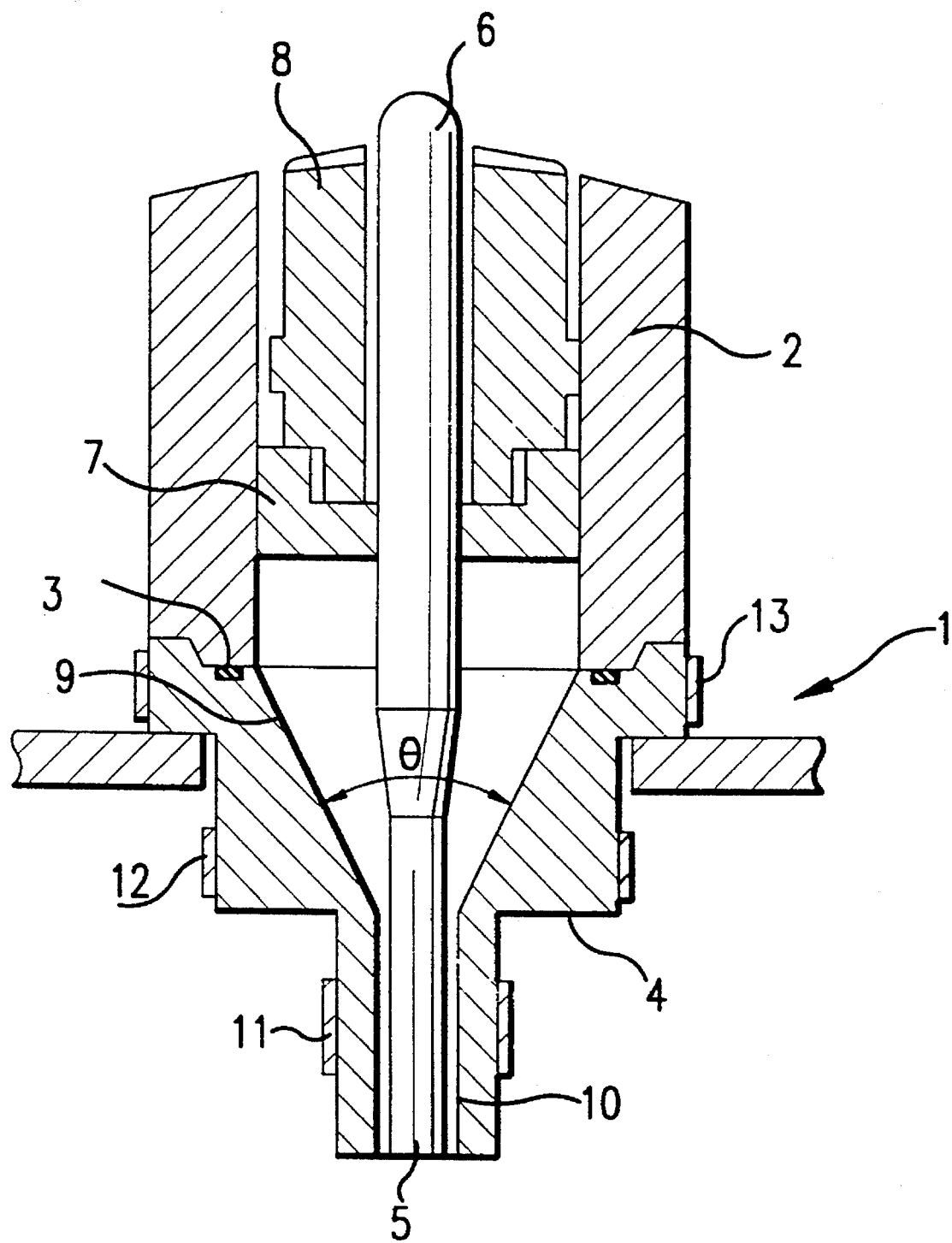
FIG. 1 is a view in lengthwise section of a conventional extrusion press.

FIG. 1 shows an extrusion press 1 comprising a tubular chamber 2 connected in a leakproof manner by a ring seal 3 to a die 4, cylindrical central rod 5 forming a die core connected by means of a mandrel 6 to a stationary part of the press, not shown. A ram 7 is capable of sliding along the mandrel 6 inside the tubular chamber 2.

A thruster 8 applies a compressive force to the ram 7, giving rise to a pressure of between 10 and 100 MPa in the die 4.

A conical cavity 9 for receiving preforms is arranged at the upstream end of the die 4 and emerges into a cylindrical passage 10 of small cross-section, arranged in the die.

The opening angle θ of the conical reception cavity 11 is generally between 30° and 60°.

FIG. 1 shows heating collars 11, 12, 13 intended to heat the die 4 to a temperature which is generally between 30° and 60° C. to facilitate the extrusion of the preforms.

By virtue of this conventional extrusion process hollow bodies are obtained exhibiting an anisotropy ratio A higher than 1 and generally substantially equal to 2.

Figure 2:
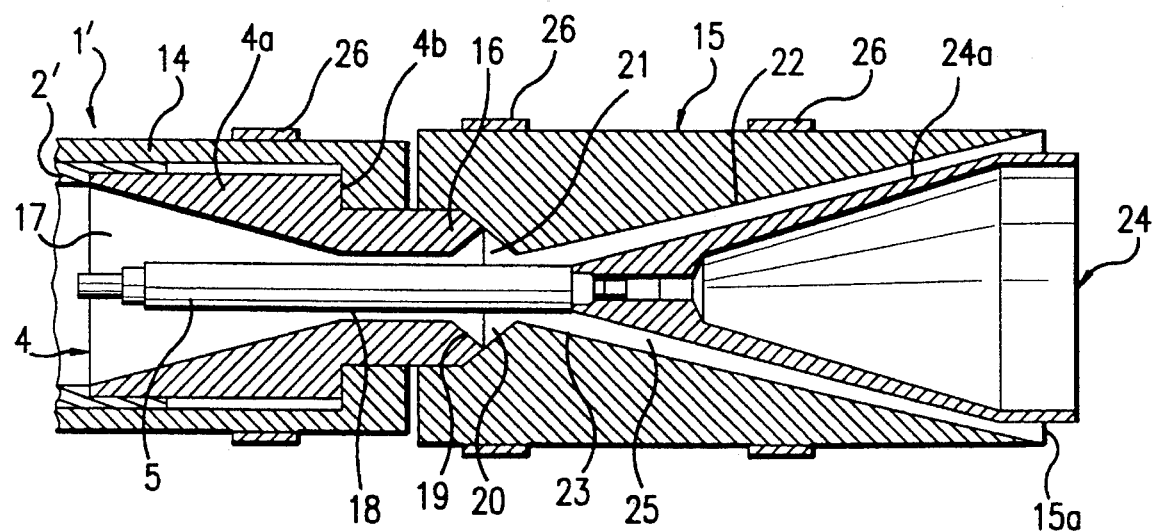
FIG. 2 is a view in partial lengthwise section of an extrusion press according to the present invention.

FIG. 2 is a partial view of an extrusion press 1' according to the present invention, showing the end part of a tubular chamber 2' for receiving the preforms (not shown in the drawing) and connected, by means of a nut 14, to a first part 4 of the die according to the present invention.

The die according to the present invention also consists of a second part 15 which fits into the first part 4.

Although it is possible to produce the die as a single block, it is advantageous to provide it in two separate parts 4 and 15, and this makes it possible, for example, to employ a conventional die, similar to that shown in FIG. 1, as first part 4.

The first part 4 has a cylindrical body 4a separated by a shoulder 4b from a tubular extension 16.

A substantially conical cavity 17 for receiving preforms is arranged at one of the ends of the cylindrical body 4a and emerges into a cylindrical passage 18 of small cross-section, arranged in the tubular extension 16.

In its turn, the passage 18 emerges into a frustoconical housing 19 arranged at the free end of the extension 16.

The extension 16 is fitted into a housing of suitable shape 20 arranged at one of the ends of the second part 15 of the die.

The housings 19 and 20 define a chamber 21 of enlarged cross-section when the two parts 4 and 15 of the die are fitted into one another.

The housing 20 emerges into an exit cavity 22 arranged at the other lengthwise end of the second part 15 of the die, passing through a second cylindrical passage 23 of small cross-section.

A cylindrical central member 5 forming a die core passes entirely through the first part 4 of the die and partially through the second part 15 of the die.

The upstream end of the central member 5 is fitted onto a mandrel forming a core-carrier (not shown in FIG. 2) and the right end is connected to an expansion component of substantially conical shape 24, housed inside the exit cavity 22.

The outer surface of the conical component 24 and the inner surface of the exit cavity 22 define an expansion zone 25 of enlarged and variable cross-section.

The generatrix 24a of the outer surface of the conical component 20 has an inclination in relation to its axis which is greater than that of the generatrix of the exit cavity 22, and this makes it possible to reduce the cross-section of the expansion zone 25 in the vicinity of the exit orifice 15a of the second part 15 of the die.

The form of the expansion chamber 21 and of the expansion zone 25 can, of course, be modified without departing from the scope or the spirit of the present invention, on condition that an enlarged cross-section is provided.

FIG. 2 also shows heating collars 26 similar to those illustrated at 11, 12, 13 in FIG. 1.

Figure 3:
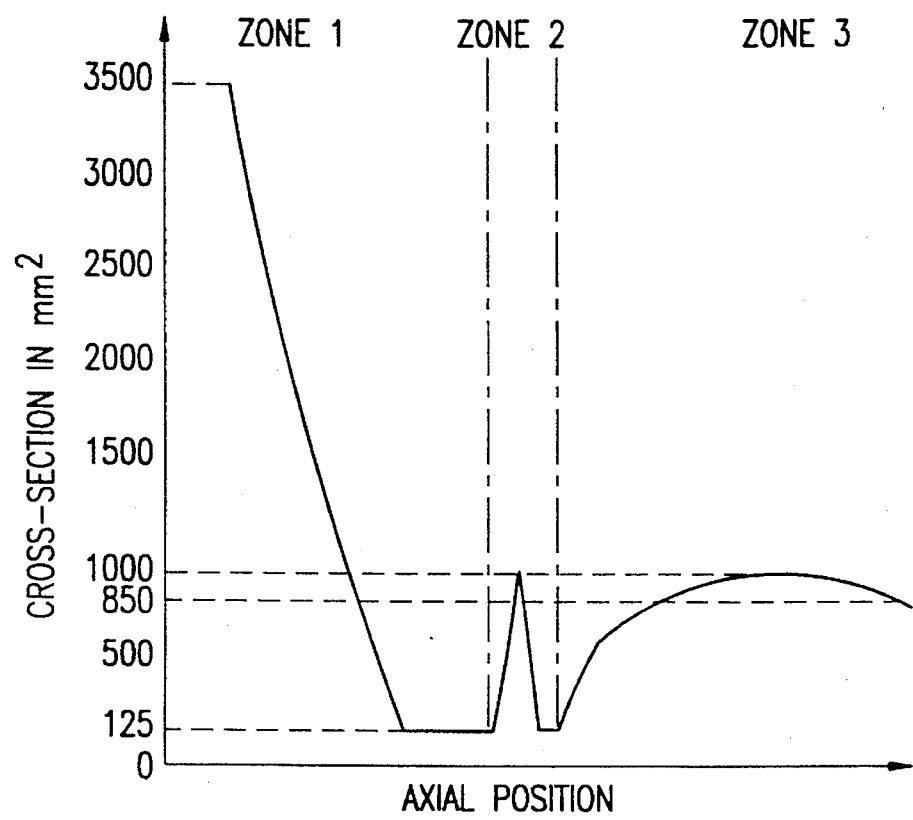
FIG. 3 is a graph representing the variation of the internal cross-section of the die of FIG. 2 as a function of the axial position in the die.

FIG. 3 shows the variation in the internal cross-section of a particular embodiment of the die according to the present invention, as a function of the axial position in the die.

It can be seen that the flow of material in the die can be divided into three different zones.

Zone 1 corresponds to a conventional die of the type illustrated in FIG. 1, in which a tubular preform of cross-section S=3500 mm$^2$ is capable of being spun in a first passage of cross-section S1=125 mm$^2$.

A first intermediate reduction ratio R1=28 is thus obtained.

Zone 2 consists of an expansion chamber of maximum cross-section S2=1000 mm$^2$ (expansion factor 8), and which emerges into a second passage of cross-section S3=125 mm$^2$.

Zone 2 acts, therefore, as a die with a reduction ratio R2=8.

Zone 3 consists of an expansion zone in which the maximum cross-section S4=1000 mm$^2$ and in which the exit orifice has a cross-section S5=850 mm$^2$.

Zone 3 therefore also acts as a die in which the reduction ratio R3=1.2.

The die according to the present invention therefore has an overall reduction ratio Ro=R1/R2×R3, that is Ro=4.

The overall reduction ratio (Ro=4) of the die according to the present invention is therefore markedly lower than the reduction ratio generally employed by a conventional extrusion press (R=50 to 500).

The cross-section of the first and second passages, and the cross-section of the chamber and of the expansion zone, may, of course, be different.

A description will now be given of an example of production of a tube according to the extrusion process of the present invention, making it possible to obtain an anisotropy ratio A=0.5.

EXAMPLE

An unsintered PTFE powder is employed, obtained by coagulation of an aqueous dispersion followed by drying. This powder is mixed with an isoparaffinic lubricant (Isopar) in a proportion of approximately 20% by weight of lubricant.

A nonfibrous isotropic (A=1) compact preform is produced by compressing the mixture of powder and lubricant at a pressure of 1.5 MPa.

This preform is in the form of a tube 70 mm in diameter and 25 mm in thickness, with a cross-section of approximately 3500 mm$^2$.

The preform is introduced into the extrusion press, the characteristics of which are illustrated in FIG. 3, at a pressure of 30 MPa and at a temperature of 40° C.

At the exit of zone 1 lengthwise-extruded fibres are obtained, exhibiting an anisotropy ratio A=2.

At the exit of the first passage the fibres become packed together and compressed in the expansion chamber of the die, as a result of the reduction in cross-section of the chamber at the second passage, so as to obtain an anisotropy ratio A=0.5.

At the exit of the second passage of zone 2, the fibres are biaxially oriented in the lengthwise and transverse directions and therefore have an anisotropy ratio A=1.

Finally, the fibres are reoriented predominantly in the transverse direction in the expansion zone 3 so as to obtain, at the die exit, a tubular section which has an anisotropy ratio A=0.5.

The tubular section obtained has a diameter of 105 mm, a thickness of 2.6 mm, with a cross-section of approximately 850 mm$^2$.

If an anisotropy ratio A higher than 0.5 is obtained after a first extrusion, it is possible to reach A=0.5 in the successive extrusions by making one or more of the following adjustments:

decrease in the diameter of the first passage of the die,
  increase in the diameter of the expansion chamber,
  increase in the cross-section of the second passage of the die.

If, after a first extrusion, an anisotropy ratio A lower than 0.5 is obtained, then A=0.5 can be obtained by performing the operations which are the reverse of those described above, or by increasing the diameter of the preform.

More generally, it is possible to adjust the anisotropy ratio over a very wide range of values of between 0.2 and 1 using the extrusion process of the present invention, by varying the abovementioned parameters.

As in a conventional lubricated extrusion, it is also possible to adjust the anisotropy ratio by varying the content of lubricant mixed with the powder or by choosing different powder qualities.

The hollow bodies obtained in the process according to the present invention exhibit the following advantages:

a mechanical strength which is as good as that of the tubes obtained by winding tapes of fluoro resin,
  a higher bursting strength under pressure and under vacuum than that of the conventional tubes,
  a strength which is as good as that of the tubes obtained by conventional lubricated extrusion, when they are subjected to the proof test recommended by ASTM Standard F 423 "Standard specification for PTFE Plastic-lined Ferrous Metal Pipes, Fittings and Flanges" published in September 1982,
  an easy production of collars at its ends,
  a low cost of manufacture,
  a lower propensity to crack than conventional tubes.

The tubes thus obtained can, furthermore, be easily standardized in size for possible connections to other components.

The process according to the present invention is furthermore particularly well suited for the manufacture of tubes for convoluted or corrugated flexible leads.

The process according to the present invention also makes it possible to produce, in the context of industrial applications, tubes of large diameter and of small thickness, while exhibiting a bursting pressure that is higher than that of the tubes obtained by a conventional process.

What is claimed is:

1. An extrusion process for the manufacture of a fluoro resin hollow body exhibiting an anisotropy ratio lower than 1 and greater than 0.2, comprising mixing an unsintered fluoro resin powder with a lubricant,
  compressing the mixture to obtain an isotropic compact tubular preform, introducing said preform into an extrusion press through a first passage of small cross-section of a die to form a material with lengthwise-oriented fibers, compressing said fibers at the exit of said first passage in an internal expansion chamber of enlarged cross-section to orient said fibers transversely, introducing said transversely oriented fibers into a second passage of small cross-section in order to reorient said fibers partially in the lengthwise direction, compressing said fibers a second time in a second expansion zone of enlarged cross-section to preserve the transverse orientation of the fibers, and expelling said fibers through an exit orifice of the die to obtain said hollow body.

2. The extrusion process according to claim 1, wherein said fluoro resin is unsintered PTFE.

3. The extrusion process according to claim 1, wherein an overall reduction ratio Ro in a range of between 2 and 20 is employed for the die.

4. An extrusion press for making a fluoro resin hollow body that exhibits an anisotropy ratio lower than 1 and greater than 0.2, said press comprising a die which at one end has a receiving cavity, for receiving a tubular preform, which emerges into a first passage of small cross-section, and a substantially cylindrical central member forming a die core and passing through said receiving cavity and said first passage, wherein the passage emerges into an internal expansion chamber of enlarged cross-section, said internal expansion chamber being connected by a second passage of small cross-section to an exit cavity arranged at the opposite end of the die, said central member being connected to an expansion component located in the exit cavity to define an expansion zone of enlarged cross-section at the exit of said second passage.

5. An extrusion press for making a fluoro resin hollow body that exhibits an anisotropy ratio lower than 1 and greater than 0.2, said press comprising a die which at one end has a conical receiving cavity, for receiving a tubular preform, which emerges into a first passage of small cross-section, and a substantially cylindrical central member forming a die core and passing through said receiving cavity and said first passage, wherein said first passage emerges into an internal expansion chamber of enlarged cross-section, said internal expansion chamber being connected by a second passage of small cross-section to a conical exit cavity arranged at the opposite end of the die, said cylindrical central member being connected to a conical expansion component located in the exit cavity so as to define an expansion zone of enlarged cross-section at the end of said second passage, the die consisting of two separate parts which fit into one another, the first part comprising the cavity for receiving the tubular preform and the first passage, the second part comprising the second passage and the exit cavity, a housing being arranged in each of facing ends of said parts to form said internal expansion chamber when the parts are fitted together, the inclination of a generatrix of the conical expansion component in relation to the axis of the expansion component being slightly greater than that of the exit cavity to reduce the cross-section of the expansion zone in the vicinity of the exit orifice of the die, the thickness of the hollow body manufactured being varied by moving the conical expansion component axially in said exit cavity by means of said die core.

6. The extrusion press according to claim 4, wherein said receiving cavity, said exit cavity and said expansion component are conical.

7. The extrusion press according to claim 4, wherein the die consists of two separate parts which fit into one another, the first part comprising the cavity for receiving preform and the passage, the second part comprising the second passage and the exit cavity, a housing being arranged in each of the facing ends of the said parts so as to form the said internal expansion chamber when the parts are fitted together.

8. The extrusion press according to claim 6, wherein the inclination of a generatrix of the expansion component in relation to its axis is slightly greater than that of the exit cavity so as to reduce the cross-section of the expansion zone in the vicinity of the exit orifice of the die.

* * * * *